Patented Mar. 22, 1938

2,111,684

UNITED STATES PATENT OFFICE 2,111,684

BOILER WATER COMPOSITION

Henry G. Venable, San Antonio, Tex.

No Drawing. Application January 13, 1934,
Serial No. 706,570

6 Claims. (Cl. 87—27)

My invention relates to material which when introduced into the water in boilers and other water containers acts to prevent the formation of rust on the walls and surfaces of the boiler or container, and to remove such rust as may have already formed thereon, and particularly to material of this character in fluid form which has the property, independent of the rust removing and preventing properties thereof, of lowering the boiling point of the water and releasing steam therefrom at a lower temperature, so that steam may be generated in a boiler at a considerable saving in fuel.

It is an important object of my invention to provide a material of the character described above which is cheap to manufacture and very convenient to use, and which is much more effective than similar materials now in use.

It is also an important object of my invention to provide a process or method of preparing and making a material of the character described above, whereby the material is economically and efficiently produced and the least amount of waste of raw materials suffered.

Other objects and advantages of my invention will be apparent from a reading of the following description and explanation, wherein for purposes of illustration I have set forth a preferred embodiment of the material and of the method of preparing the same.

This application is a continuation in part of my co-pending application entitled Rust removing and preventing material, Serial No. 531,859, filed April 21, 1931, the present application constituting an improvement upon and development of the subject matter disclosed and claimed in the said copending application.

The present process for producing the rust remover and preventer of the invention requires acting upon leaves of plants of the Agave family of plants in the following manner:—

The Agave plant leaves aforesaid are crushed and pressed in any suitable manner to extract and expel therefrom the native juice of the leaves.

The extracted juice is placed in closed vessels having vent openings in the top thereof and permitted to remain therein until the juice ferments. The fermentation step requires about ten days, the length of time required for fermentation being somewhat affected by the weather conditions obtaining at the time the step is conducted. While the juice is thus resting in the said closed vessels with the vented tops, agents of fermentation may be added from time to time. Any agents of fermentation may be used which possess the general fermenting characteristics of yeast, a variety of suitable agents for this purpose being available.

After the fermentation step has started, the fermenting liquid is passed through a filtering vat and thence through two or more filtering presses, for the purpose of removing the solid content of the liquid.

After the liquid has been passed through the filtering step outlined above, it is placed into closed heating vats or boilers and caused to simmer at a temperature of about 100 degrees Fahrenheit for a period of about ten (10) hours.

At the end of the simmering period outlined above, a quantity of dry field corn on the cob, with the shucks removed, equal to about ten percent (10%) by weight of the liquid is added and the whole permitted to continue to simmer for an additional ten hour period.

At the conclusion of the foregoing steps, the liquid is drawn off from the heating vats or boilers and run into open vats, wherein a portion of the liquid content is permitted to evaporate until a sticky, plastic mass remains, having a consistency like that of thick molasses.

At this stage, lactic acid is added to the sticky mass in proportions of one kilo of lactic acid to each one hundred (100) kilos of the mass, and when this has been done, sufficient water is added to the whole to render the mass sufficiently fluid to flow easily.

The resultant of the above steps is then placed into pressure boilers and heated so that vapors are released and a pressure is built up within the boilers of approximately 120 pounds per square inch.

When the pressure mentioned has been reached, the lighter vapors are permitted to escape by a quick opening valve, a number of suitable types of which are in use. The heating involved in the presently described step is continued along with the release of the lighter vapors at a temperature of about 100 degrees Fahrenheit until the liquid has reached a density of approximately twenty (20) degrees Baumé. This liquid is the product of the invention which is to be introduced into the water of the boiler or any container to prevent the formation of rust therein or to remove rust already formed therein.

The vessels utilized in the steps described above, in my practice of the invention, have been metal, principally steel, but it is presently believed that the success of the process is not materially affected by the character and quality of the material of which the vessels may be made.

When the substance of the invention is to be used merely for reducing the boiling point of the water in a boiler to secure generation of steam therefrom at a lower than normal temperature, without regard to the treatment or prevention of rust, the substance is added to the water in the approximate proportion of one (1) part of the substance to twenty-four thousand (24,000) parts of the water.

Although I have shown and described herein a preferred embodiment of my invention, it is to be definitely understood that I do not desire to limit the application of the invention thereto, and any change or changes may be made in materials and ingredients, and in the steps and operations involved in the preparation thereof, within the spirit of the invention and the scope of the subjoined claims.

What is claimed is:—

1. A process of making a rust preventer and remover of the character described, said process comprising fermenting juice extracted from a plant of the Agave family, removing the solid content of the said juice, then heating the resultant in a closed space at an approximate temperature of 100° F. for about ten (10) hours; then adding thereto about 10% by weight of dry corn, and continuing the said heating for an additional ten (10) hour period; then drawing off the resulting liquid and permitting the same to evaporate until a non-flowing mass results, then adding thereto about one kilo lactic acid for each 100 kilos of said mass, and to the resultant adding sufficient water to produce an easy flowing condition thereof; then heating the resultant of the foregoing steps in a closed space until a pressure of approximately 120 pounds per square inch is developed therein, then permitting some of the lighter resulting vapors to quickly escape while continuing the heating until a liquid is produced testing approximately 20° Baumé.

2. A boiler "water" consisting of approximately one part of a mixture of a substance consisting of fermented Agave plant juice, lactic acid, corn, and water, in approximately 24,000 parts of plain water.

3. A substance of the character described comprising the resultant of a heated and evaporated aqueous mixture of evaporated ferment of Agave juice, corn, lactic acid, and water.

4. A substance of the character described containing evaporated ferment of Agave juice, corn, lactic acid, and water, said substance testing approximately 20° Baumé.

5. A rust and incrustation removing and preventing substance for use with boiler water in approximate proportions of one part of substance to 24,000 parts of boiler water, said substance comprising an aqueous dilution of the resultant of a heated mixture of fermented Agave plant juice, dry field corn, and lactic acid, the water being present in excess of the degree of fluidity required, said resultant being heated until the same tests approximately 20° Baumé.

6. A method of making an incrustation and rust removing and preventing substance for use with boiler water, said method comprising fermenting a quantity of Agave plant juice, then removing the solid matter from the juice, then confining the juice from the atmosphere and heating the juice to a temperature of about 100° F. for a period of about 10 hours, then introducing about 10% by weight of dry field corn and continuing the heating for an additional period of about 10 hours; then removing the resultant from the heat and exposing the same to the atmosphere to evaporate to a consistency approximating that of molasses, then adding thereto about one kilo lactic acid for each 100 kilos thereof, then adding thereto sufficient water to render the resultant easy-flowing; then confining the resultant from the atmosphere and heating the resultant until a pressure of about 120 pounds per square inch is developed therein and then quickly releasing the lighter vapors therefrom, the last mentioned heating and the releasing of the lighter vapors being continued at an approximate temperature of 100° F. until the resultant liquid has reached a density of approximately 20° Baumé.

HENRY G. VENABLE.